United States Patent
Bickford et al.

(10) Patent No.: US 7,386,549 B2
(45) Date of Patent: Jun. 10, 2008

(54) INTEGRATION OF BUSINESS PROCESS AND USE OF FIELDS IN A MASTER DATABASE

(75) Inventors: Jeanne P. S. Bickford, Essex Junction, VT (US); Ernest J. Burger, Highland, NY (US); Thomas R. Maheux, South Hero, VT (US); Paul G. McLaughlin, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 10/249,690

(22) Filed: Apr. 30, 2003

(65) Prior Publication Data
US 2004/0220937 A1 Nov. 4, 2004

(51) Int. Cl.
*G06F 17/30* (2006.01)
(52) U.S. Cl. ........................................ 707/8
(58) Field of Classification Search ............. 707/104.1, 707/1, 2, 8, 10; 705/9; 709/203; 714/48; 715/530
See application file for complete search history.

(56) References Cited

U.S. PATENT DOCUMENTS

2004/0019634 A1 * 1/2004 Van Geldern et al. ...... 709/203

* cited by examiner

*Primary Examiner*—Etienne Leroux
(74) *Attorney, Agent, or Firm*—Gibb & Rahman, LLC; Richard M. Kotulak, Esq.

(57) ABSTRACT

A system that registers the relationship of use and dependencies in a master source database (i.e., a registration schema) thereby providing cohesiveness between the master source data and downstream systems that receive the master source data fields. The registration schema provides rules for a generic data bridge which executes the movement of master source database data to downstream systems, providing further cohesive connection between what was registered for use and dependencies and what actually occurs in the movement of data to downstream systems. The generic data bridge's actions, on a field-by-field basis, are documented in a use and dependency model. In addition, modification of the use and dependencies registration section of the master source database allows changes to made as opposed to having to modify specific system bridges.

19 Claims, 5 Drawing Sheets

FIG.3

USE AND DEPENDENCIES TABLE (330)

| PROCESS NAME | RELEASE | RELEASE | FULFILLMENT | FULFILLMENT | FULFILLMENT | PLANNING | PLANNING |
|---|---|---|---|---|---|---|---|
| FIELD | PN | PN | PN | PN | PN | PN | PN |
| DEPENDENCY | CREATE | OWNER | READ | APPROVAL | DESCRIPTION | READ | APPROVAL |

FIELDS REGISTRATION TABLE (360)

| FIELD NAME | PN | DESCRIPTION |
|---|---|---|
| SIZE | 12 | 100 |
| TYPE | CHAR | CHAR |

CHANGE REQUEST TABLE (310)

| CHANGE FIELD 312 | PN 313 |
| REQUESTER 314 | RTM 315 |
| DESCRIPTION 316 | EXPAND TO 12 POSITIONS 317 |
| STATUS 318 | PENDING 319 |
| CHANGE ID 320 | 500 321 |

CHANGE APPROVAL TABLE (380)

| CHANGE ID 389 | 500 | 500 |
| APPROVER 385 | FULFILLMENT 386 | PLANNING 387 |
| STATUS 389 | APPROVED | PENDING |

REFERENTIAL POINTERS CONNECT THE TABLES

USE AND DEPENDENCIES TABLE

510 →

| PROCESS NAME 511 | FULFILLMENT 512 | FULFILLMENT 513 |
|---|---|---|
| FIELD 514 | PN 515 | DESCRIPTION 516 |
| DEPENDENCY 517 | TRANSFER 518 | TRANSFER 519 |

FIELDS REGISTRATION TABLE

REFERENTIAL POINTERS CONNECT THE TABLES

530 →

| FIELD NAME 531 | PN 532 | DESCRIPTION 533 |
|---|---|---|
| SIZE 534 | 12 535 | 100 536 |
| TYPE 537 | CHAR 538 | CHAR 539 |

TRANSFER DEFINITION TALBE

REFERENTIAL POINTERS CONNECT THE TABLES

550 →

| PROCESS NAME 551 | FULFILLMENT 552 | FULFILLMENT 553 |
|---|---|---|
| FIELD 554 | PN 555 | DESCRIPTION 556 |
| VIEW 557 | FULFILLMENT VIEW 558 | FULFILLMENT VIEW 559 |
| HANDLING 560 | NONE 561 | DESCRIPTION (PN)[DESCRIPTION] 562 |

VIEW DEFINITION TABLE

REFERENTIAL POINTERS CONNECT THE TABLES

570 →

| FIELD NAME 571 | PN 572 | DESCRIPTION 573 |
|---|---|---|
| VIEW NAME 574 | FULFILLMENT VIEW 575 | FULFILLMENT VIEW 576 |

FIG.5

INTEGRATION OF BUSINESS PROCESS AND USE OF FIELDS IN A MASTER DATABASE

BACKGROUND OF INVENTION

1. Field of the Invention

The present invention generally relates to a system and method to manage and implement change to a database field by a notification and approval process and, more specifically, registering and managing process dependencies on the database field.

2. Description of the Related Art

Master source databases are used to feed applications such as business processes and, in addition, are used for ad hoc information review. For example, business processes routinely access master source database for input to start and run business functions and/or to assist in making decisions.

However, the use and dependency requirements on the information contained within the master source databases, which are required to run the business processes, are seldom to never recorded. Thus, the knowledge of which database fields are required to run a particular business process is often limited to the original owners of the business process. Over the course of time, this knowledge deteriorates to the point that finally the reasons for supplying data to a particular business process and which process uses a particular database filed is forgotten or lost.

After the use and dependency requirements are marginalized, the ability to communicate to business process owners affected by changes to the database is difficult, impractical or impossible. Thus, a group introducing changes to the database may unintentionally and/or unavoidably making the business process invalid and/or obsolete. Conversely, business processes cannot easily communicate to the database when the business process no longer is dependent upon a particular dependency, thereby promulgating waste in the database.

In addition, business systems using relational databases require transfer bridges to move data from the downstream systems. Each movement of data to a separate system requires development and maintenance of a system specific bridge. As the use and dependency requirements change between master source database and data consumer, the original transfer bridge must be edited. However, transfer bridges are unique and require much maintenance and an understanding of the original use and dependencies. When this original knowledge of the decisions of how and why the transfer bridge was designed is lost, the maintenance and updating of the transfer bridge is time consuming and highly inefficient. Therefore, there is a need for a better method to manage use and/or dependency requirements.

SUMMARY OF INVENTION

The invention comprises a system and method that registers the relationship of use and dependencies in the master source database (i.e., a registration schema) thereby providing cohesiveness between the master source data and downstream systems that receive the master source data fields.

In addition, the registration schema provides rules for a data transfer bridge which executes the movement of master source database data to downstream processes and systems, which provides further cohesive connections between what was registered for use and dependencies and what actually occurs in the movement of data to downstream systems. The transfer bridge's actions, on a field by field basis, are documented in a use and dependency model. The transfer bridge allows modification of the use and dependencies registration section of the master source database to be used by the downstream process without having to modify specific system bridges. The operational attributes and the database manipulation rules of downstream systems contribute to the creation of the transfer bridge.

One aspect of the invention is a method to register processes using a database fields, database fields which are being used by a process, and use and dependencies that exist between the database field and the process, thereby forming a registration schema. The registration schema is utilized to manage and implement changes in the database field and/or process.

Another aspect of the invention is a method to notify processes that are dependent on database field when a change or change request is pending. Furthermore, the notification method includes asking for and receiving approval from a dependent process on a database field before a change can be implemented to that database field.

Therefore, as shown above, the invention provides a system and method to manage and implement change to a database field by a notification and approval process by registering and managing process dependencies on the database field and the changes are transferred to dependent processes via a generic transfer bridge.

BRIEF DESCRIPTION OF DRAWINGS

The invention will be better understood from the following detailed description of preferred embodiments with reference to the drawings, in which:

FIG. 3 are database tables and their respective relationship with each other illustrating one embodiment of the invention;

FIG. 5 are database tables and their respective relationship with each other illustrating one embodiment of the invention.

DETAILED DESCRIPTION

The present invention provides a system and method of registering and managing the relationships of the use and dependencies in a database. The invention includes database fields and database records to store the relationships and a business process registry to ensure that the use and dependencies of a particular business process are captured.

More specifically, the present invention includes a change management system and a process to manage changes associated with a database, utilizing the database technology itself to document the change, and use of the information in the database to execute the changes. Containers in the database are used to store the relationship information.

Figure 1:
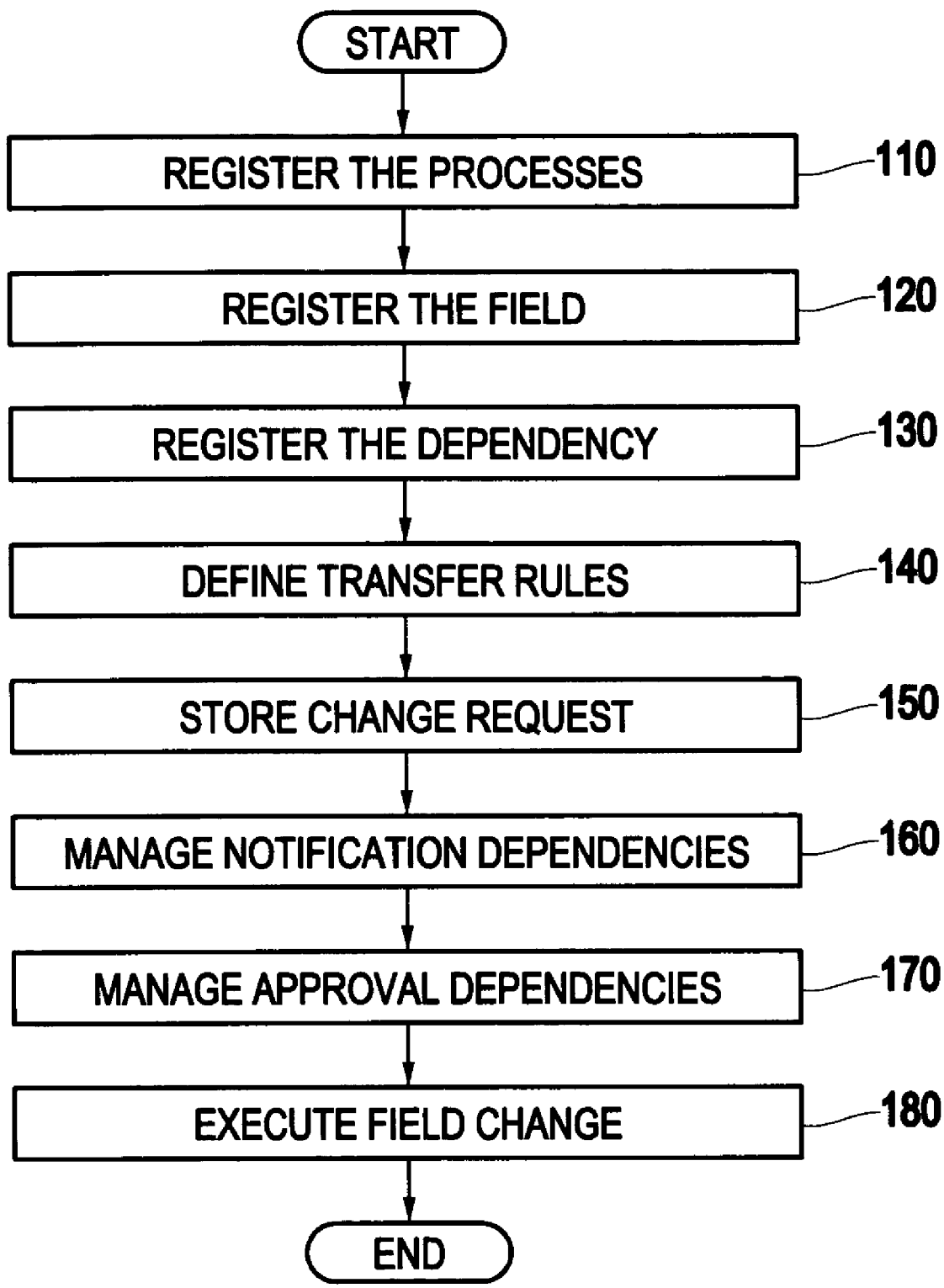
FIG. 1 is a flow diagram of one embodiment of the invention of a method of managing a change requests to a database field.

FIG. 1 is a flow diagram of one embodiment of the invention of a method of managing a change requests to a database field. The database field is accessed and/or utilized by at least two processes. In other words, each process is dependent on the data stored in the database field.

First, each process that utilizes the database is registered (Step 110). In an embodiment of the invention, a database container stores definitions that describe each process. Examples of process definitions include, but are not limited to, a unique identifier or process name, an owner, a description of the process, a contact person, and/or other information that would describe the process such as, but not limited to, a business process document Web page. Entering a process definition ( i.e. a name for example) in the process definition container registers the business process in the master source database.

The next step includes registering each database field (Step 120). In an embodiment of the invention, a database container stores the definitions of a particular fields and is located in the master source database. The field definition container describes the fields. In an alternative embodiment of the invention, the field definition container includes a definition of how a particular field is grouped or linked to other fields. As applied to a relational database, for example, groupings are represented as tables and fields are represented by columns. In an alternative embodiment of the invention, an additional container aggregates groups of fields to enable a more productive re-use of field information.

After registering the process and the field, the dependency is registered (Step 130). In an embodiment of the invention, a database container stores the relationships (i.e., dependencies) between the field or group of fields and the process. The OLE_LINK1 field and process relationship database container OLE_LINK1 establishes a relational connection between the field and the process. In addition, the field and process relationship database container records the type of the dependency. Examples of dependency types include, but are not limited to, owner, read, create, modify, delete, verify, approve, publish, critical use, transfer, and/or others that have meaning to specific business processes. The connection in the field and business process relationship database container between the process definition container and the field definition container records the process dependencies against fields in the database.

Each dependency on a particular field is contained in a separate dependency container and is organized in a structured hierarchy. The organization of the dependency containers in a hierarchy provides for all dependencies on a particular field to be identified. In an alternative embodiment, a user can discover which fields are being utilized by which processes by examining the hierarchy of the dependency containers, thereby allowing for optimal use of the database.

Once the dependency is registered, transfer rules are defined, based on the dependency, to control the transfer of data from the field to the process (Step 140). The transfer rules describes how and when fields in the database are moved to the processes. These rules are used to create a transfer bridge. The transfer bridge controls the movement of data from the field to the process. In an embodiment of the invention, an additional database container stores the transfer rules. The transfer rules include for example, but are not limited to, operational transfer attributes and/or data manipulation rules (i.e., to manipulate the data within the field). The process of entering the operational transfer attributes, for example, into the transfer container establishes the mechanics of moving data to a downstream system. In an alternative embodiment, as the complexity of the transfer rules increase, additional transfer containers are utilized to store the criteria to create and/or execute the transfer bridge.

The registration of the processes, the fields, the dependencies and the creation of a transfer bridge establish a management schema by which change requests to the data field are managed. After receiving a change request, the change request is stored (Step 150). In an embodiment of the invention, a database container stores the change request. In an alternative embodiment, multiple change containers store change requests. The change request container describes each change, including a connection to the fields affected by the change.

In an alternative embodiment, the type of dependency a process has on a field is modified by a change request. For example, a READ dependency may be changed to a READ and APPROVE dependency.

After a change request is received to change a particular field, all processes that have a notification dependency on that field are notified of the change request (Step 160). In an embodiment of the invention, the processes having a notification dependency on the filed are identified by examining the dependency containers associated with the field. The dependency containers are organized in a hierarchy.

The hierarchal nature of the dependency containers allow for all the containers that are dependent on a particular field to be identified. After a particular dependency container is identified for a notification dependency, the process attached to the dependency container is notified that a change request is being made to change the field. The change information is contained in the change container (i.e. , a description of the pending change) and the process information is contained in the process definition container (i.e. , who and how to notify of a pending change request)

After the notification dependencies are managed for the change request to a field, all processes that have an approval dependency on the field are requested to approve the change request (Step 170). In an embodiment of the invention, the processes having an approval dependency on the fields are identified by examining the dependency containers associated with the field. After a particular dependency container is identified for an approval dependency, the process attached to the dependency container is requested to approve the request. The change information is contained in the change container and the process information is contained in the process definition container. In an alternative embodiment, approval information includes, but is not limited to, signatures.

After all notification dependencies and approval dependencies have been fulfilled, the requested change to the database field is executed. In an alternative embodiment, any downstream processes that rely on the database field are sent execution commands via the transfer bridge stored in the transfer container.

Object-relational database technology is used to register and/or manage a field, a process, a dependency, change requests, etc.

Software and/or hardware provides user interface including, but not limited to, to register and/or manage a field, to register and/or manage a process, to register and/or manage a dependency between a field and a process, to register and/or manage a change and/or change request, to register and/or manage a dependency, to register and/or manage a notification dependency, approval dependency, a change notification and/or a change authorization, etc.

Access to a particular field is not granted unless that field is registered. The control of the access to a field ensures that fields will be registered. The accuracy and/or timeliness of data in a field is ensured by reviewing the data in the field at set time intervals thereby ensuring that a process accessing the data in the field will have the most accurate and most timely data available.

Database suppliers (such as a process, etc.) are notified when any and/or all dependencies on a particular field is (are) removed. When there are no dependencies on a particular field, the purpose of the whether or not to utilize that field can be considered by the owner of the field. For instance, when all the fields in a particular column in a database, for example, have no dependencies, then the column can be deleted, thereby reducing the size of the table, etc. In addition, an owner/operator can examine the database for the number of dependencies. This examination allows the owner/operator to decide whether or not it is optimal to continue providing a particular database to a particular process or better to stop providing access to a particular process and delete the database, etc.

A notification dependency includes, but is not limited to, notifying a process owner when content and/or behavior of a specific field changes or is requested to be changed. Likewise, an approval dependency includes, but is not limited to, seeking and gaining approval from a process owner when content and/or behavior of a specific field changes or is requested to be changed. A notification dependency includes, but is not limited to, notifying a process owner when a new database field is added or requested to be added to the database. Likewise, an approval dependency includes, but is not limited to, seeking and gaining approval from a process owner when a new database field is added or requested to be added to the database.

Database containers are used to record and/or registering process requirements, field attributes, relationships between a field and a process, logistical operation attributes for the transfer bridge. Examples of process field requirements and field attributes are field selection criteria such as, but not limited to, require fields A, B and C, where A equals text length 21, where B equals integer length 5 and C equals decimal length 8.2. Examples of defining the relationship between the field and the process are a one-to-one relationship (field A moves to process field X) and the ability to define customizing attributes (concatenate field A, and move field B to process field X). Examples of defining logistical operation attributes for a transfer bridge include target process type (relational DB2, relational Oracle, Lotus Notes, SAP) and relational views or configurations that join multiple tables into a single view.

In an embodiment of the invention, a generic transfer bridge program reads database fields and tables based on process requirements, extracts the requested data from the database, prepares the data for transfer to the process, and executes the data movement from the database to the process.

An embodiment of the invention is applied to the management of a company's source part number ("PN") data as it relates to a particular company business process. FIGS. 2-5 illustrate this embodiment and includes diagrams of the various tables and the relationships between the individual tables.

Figure 2:
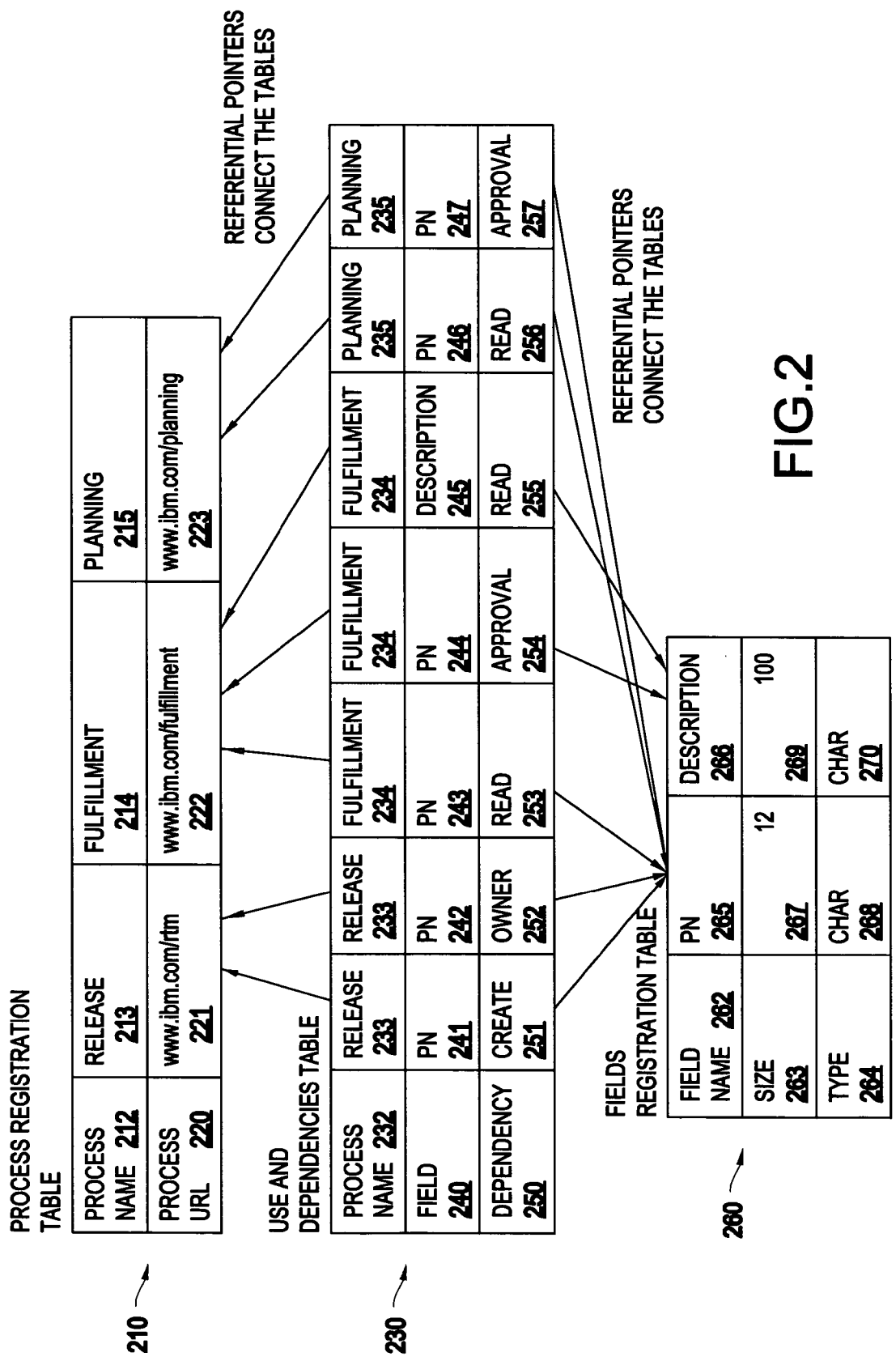
FIG. 2 are database tables and their respective relationship with each other illustrating one embodiment of the invention.

FIG. 2 illustrates three tables within a master source database and includes a Process Registration Table 210, a Use and Dependency Table 230, and a Field Registration Table 260. The master source database in this illustration is used to store PN information.

The Process Registration Table 210 and includes a Process Name container 212 and the Process Data container 220.

The Process Name container 212 includes three processes, a RELEASE process 213, a FULFILLMENT process 214 and a PLANNING process 215. The owner of the business process documents the business process in a shareable form and register the process in the Process Registration Table 210. The connection from the process registration to the process documentation are the fields in the Process Registration Table 210. Each process has corresponding data which, in this case, are HTML-based Web pages. Thus, the corresponding data for the HTML-based Web pages is a URL address 220. Accordingly, the RELEASE process 213 has URL address: www.ibm.com/release 221, the FULFILLMENT process 214 has URL address: www.ibm.com/fulfillment 222 and the PLANNING process 215 URL address: www.ibm.com/planning 223. The HTML-based Web pages are an example of a documentation media.

After the Process and Registration Table is established, any use and dependencies are recorded in a Use and Dependency Table 230. The Use and Dependency Table 230 includes the Process Name 232, (RELEASE 233, FULFILLMENT 234, PLANNING 235) an associated data field 240 and an associated dependency 250. Thus, The RELEASE Process 233 has two dependencies, a CREATE dependency 251 and an OWNER dependency 252. The two associated data fields 241, 242 are supplied with data from the RELEASE process 233 and, in this example, contain PN data. The RELEASE process 233 was first registered and then a CREATE dependency 251 is created against the associated PN field 241. The registration and recordation established the Release process as the data supplier for the associated PN field.

The FULFILLMENT process 232 has three dependencies, a READ dependency 253, an APPROVAL dependency 254 and another READ dependency 255. The associated data fields 243, 244 for the READ dependency 253 and the APPROVAL dependency 254 contain PN data derived from the FULFILLMENT process 232 and the other READ dependency 255 contains description data derived from the FULFILLMENT process 232.

The FULFILLMENT process 232 is registered and recorded with a READ and APPROVAL dependencies against the PN field. The automated system informs the RELEASE process owner that a request to access the PN field is recorded.

The PLANNING process 233 has two dependencies, a READ dependency 256 and an APPROVAL dependency 257. The data fields associated with the READ dependency 256 and the APPROVAL dependency 257 are derived from the PLANNING process 233 and contain PN data 247.

The PLANNING process 233 is registered and recorded with a READ and APPROVAL dependencies against the PN field. The automated system informs the RELEASE process owner that a request to access the PN field is recorded.

A business process supplies the data to the master source database and requests access to the master source database to establish data entry as a result of executing the business process. A supplier process is registered as the owning process for the data fields and have a dependence of CREATE.

The Field Registration Table 260 contains definitions for each of the fields 262 by size 263 and by type 264. In this case, there are two fields, the PN field 165 and Description 266. Accordingly, the PN field 265 has a field size of 12 267 and a field type of character 268 and the Description field 266 has a field size of 100 269 and a field type of character 270.

FIG. 3 illustrates the relationships between a Change Request Table 310, a Change Approval Table 380 and the Field Registration Table 360 (as illustrated in FIG. 2). The Use and Dependency Table 330 (as illustrated in FIG. 2) is also present in FIG. 3 in order to illustrate the indirect path to the processes that have a registered approval dependency.

The Change Request Table 310 includes the Change Field 312, the Requester 314, the Description 316, the Status 318 and the Change ID 320. In the example, a change request to expand the size of the PN field from seven positions to twelve positions is recorded in the change management section of the database by the RELEASE process owner.

Thus, the Change Request Table contains PN data 313 as the Change Field 312, the Release Process 315 as the Requestor 314, the description of the change request 317 as the Description 316, pending 319 as the status 318 and 500 321 as the change ID 320.

The Change Approval Table 380 contains any process that is required to approve of a change (i.e., that was previously recorded). The Change Approval Table 380 contains the Change ID 381, the Approver 385, and the Status 389. In the example, both the FULFILLMENT process and the PLANNING process are both registered as requiring to give approval of any change, thus the Change Approval Table contains the FULFILLMENT process 386 and the PLANNING process 387 as Approvers 385.

Notification of the change is sent to the Fulfillment process owner and Planning process owner since the both the FULFILLMENT process owner and the PLANNING process owner were previously recorded APPROVAL dependencies on the PN field. Thus, the subsequent change request will not be "approved" until both the FULFILLMENT and PROCESS owners approved the change. The use of the data fields and the ownership of data fields are determined by database queries. Thus, the status of the change is pending until all process owners with an approval dependency have an approval record for this change id. Therefore, the status of the change in the Change Request Table 310 is pending 319.

When the PLANNING process no longer required PNs to perform the planning function, the PLANNING process terminated the dependencies in the database by updating the use and dependency container. The master source database notified the RELEASE process owner (who was registered as the owner and creator of the PN field). The Fulfillment process was the remaining process with a recorded dependency against the PN field. Thus, the Fulfillment process continued populating the PN field. If the Fulfillment process terminated the dependency on the PN field, the Fulfillment process would not populate the PN field. Therefore, the RTM process owner is left to review any need to populate the PN field.

The Fulfillment process also required a data feed to the Fulfillment system to establish product identifiers and product attributes. The fulfillment process recorded a transfer dependency and their transfer attributes. Three of the attributes identified the following, for example: 1) movement of data occurs every day at 5:00 am; 2) during the data movement replace the description field with a concatenation of the PN field and original description field; and 3) move all PN's created or modified since the previous execution of the bridge.

The generic transfer bridge: 1) read the transfer instruction; 2) accessed the data that met the selection criteria; and 3) moved the data to the fulfillment system. During the move, the description field concatenated with the PN field.

In an embodiment of the invention, the data transfer bridge is created once and is reused for all subsequent bridges.

Figure 4:
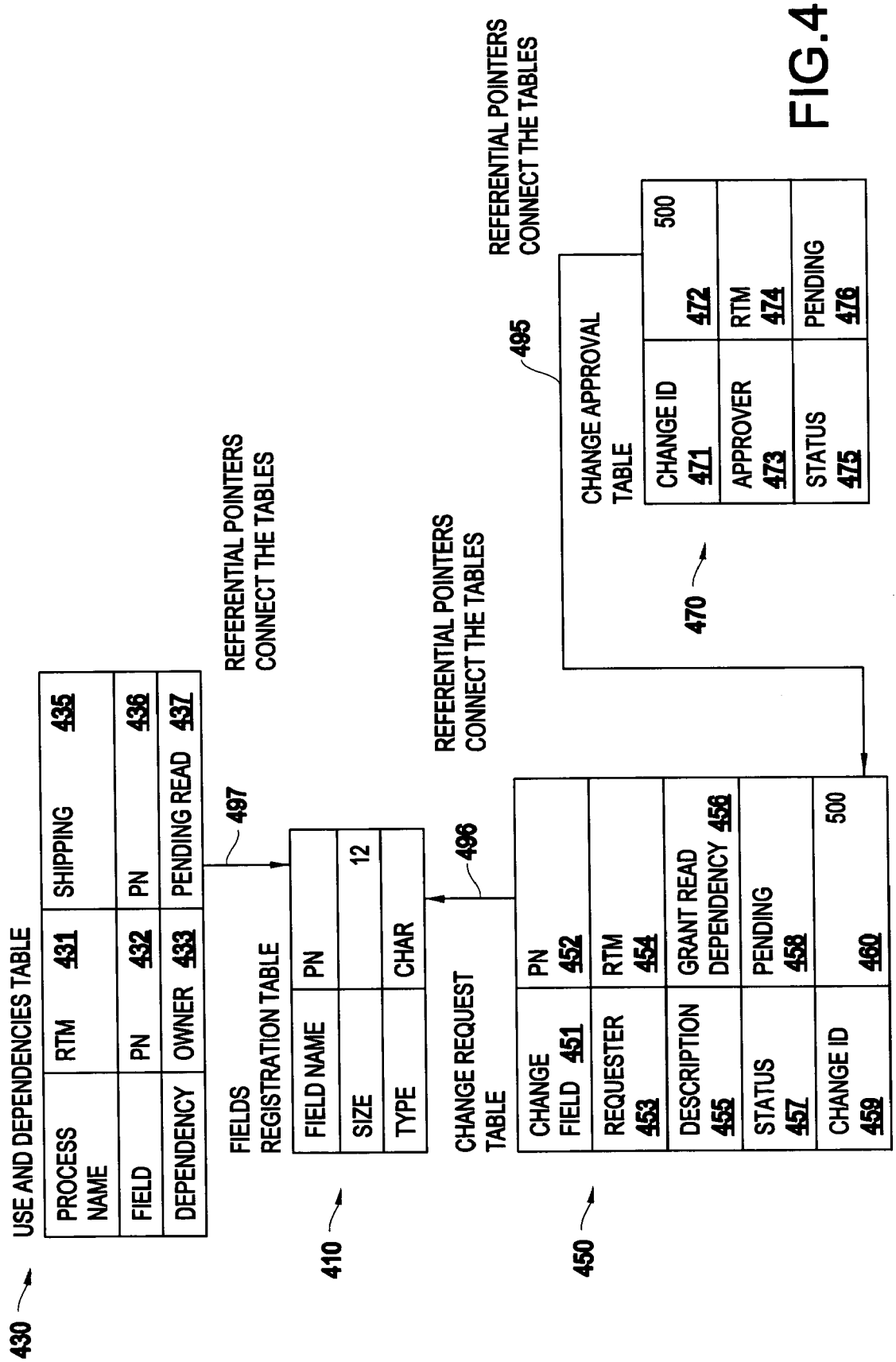
FIG. 4 are database tables and their respective relationship with each other illustrating one embodiment of the invention.

FIG. 4 are database tables and their respective relationship with each other illustrating one embodiment of the invention and, more specifically, continues the example illustrated in FIGS. 2 and 3 and illustrates the relationships between a Change Request Table 450 (previously illustrated in FIG. 3) and the Use and Dependency Table 430 (previously illustrated in FIG. 2) when a request for a change to a business process is made. In this example, the change request is that a "new dependency for a shipping process is being added to filed containing PN data.

The Use and Dependency Table 430 contains the ownership information for the PN field 432, which is the target of change request. The RTM process 431 is the recognized owner of the PN field 432 according to the dependency information 433.

In an embodiment of the invention, the RTM process, as the recognized owner of the PN field, becomes the default approver for new dependencies against the PN field.

Accordingly, the Use and Dependency Table is modified to represent the requested change. Thus, the Shipping Process is added as a Process Name 435, the field is added to include the PN data 436, and the dependency is added to include the new dependency 437, i.e., a Pending READ, for example. The Read dependency is "Pending" until the field owner has approved the request for the new dependency.

A referential pointer connects 496 the change request Table 450 to the Field and Registration Table 410 (as previously illustrated in FIG. 2) so that the Field Registration Table 450 can coordinate the parameters of the field 436.

The Change Request Table 450 is linked by referential pointer to the Field Registration Table 410 and includes the Change Field 451, the Change Requestor 453, the Description of the requested change 455, the Status of the requested change 457, and the Change ID 459. The Change Request Table contains information that manages the change request by the shipping process. Since the owner of the PN field is the RTM process, the Change Request Table contains information about the RTM process for which any change request to the PN field would have to overcome. Thus, the Change Request Table includes PN data 452 in the Change Field 451, the RTM process 454 as the Change Requestor 453, the description of the change, i.e., "Grant Read Dependency" 456 as the Change Description 455, the status of the change, i.e., pending 458 as the Status 457, and a change ID of 600 460 as the Change ID 459.

A referential pointer 495 connects the Change ID 459 to a Change Approval Table 470. The Change Approval Table contains information about who can approve the change such as the Change ID 471, an Approver 473, and a Status 475 of any change. Thus, continuing the example, the Change Approval Table contains a Change ID of 600 472, an approver of the RTM process 474 and the status of the change request of pending 476.

Once a change request is recorded against a field, all owners with a notification and/or authorization dependency on the field are linked to the change request. Once notification and/or authorization is given and/or received, the change transforms from pending to implemented.

FIG. 5 are database tables and their respective relationship with each other illustrating one embodiment of the invention and, more specifically, continues the example illustrated in FIGS. 2-4 and illustrates the relationships between a Transfer Definition Table 510, the Field Registration Table 530

(previously illustrated in FIGS. 2-4), a Transfer Definition Table 550, and a View Definition Table 570.

The Use and Dependency Table 510 includes Process Name fields 511, the data field names 514, and Dependency fields 517. Continuing the example, there are two types of data within the data field 514, an actual PN data field 515 and a description data field 516 of the PN. The PN 515 is associated with the Fulfillment Process 512 and the description 516 is associated with the Fulfillment Process 513. In addition, each data field has a corresponding dependency 517. The PN 515 has a transfer dependency 518 and the description 516 has a transfer dependency 519.

The Field Definition Table 530 includes Field Names 531, Size of each field 534, and Type of each field 537. Thus, continuing the example, PN 532 and Description 533 are the Field Names, the Size of the PN field is 12 535 and the Size of the Description Field 516 is 100 536.

The Transfer Definition Table 550 includes the Process Name 551, the Field Name 554, the View 557, and the Handling 560. Thus, continuing the example, the Field Names 554 are PN 555 and Description 556. The associated Process Name 551 is Fulfillment 552 for the PN field and Fulfillment 553 for the Description field. The View 557 for the PN field is Fulfillment View 558 and the View 557 for the Description field is Fulfillment view 559, i.e., since Fulfillment is the associated process for each field. The Handling 560 for the PN field is "none" 561 and the Handling 560 for the Description field is "description equals the PN and the Description" 562.

The View Definition Table 570 includes the Field Name 571 and the View Name 574. Thus, continuing the example, the Filed Name 571 is PN 572 and Description 573. The associated View Names 574 are Fulfillment View 575 for the PN field and Fulfillment View 576 for the Description field.

Referential pointers are used to connect the Field Definition Table 530 to the Use and Dependency Table 510, to connect the Transfer Attribute Table 550 to the Field Definition Table 530, and to connect the View Definition table 570 to the Transfer Attribute Table 550.

Therefore, as shown above, the invention provides a system and method to manage and implement change to a database field by a notification and approval process by registering and managing process dependencies on the database field and changes are transferred to dependent processes via a generic transfer bridge.

While the invention has been described of preferred embodiments, those skilled in the art will recognize that the invention can be practiced with modification within the spirit and scope of the appended claims.

The invention claimed is:

1. A method of managing a change request to a database field wherein at least one business process has a dependency on said database field, said method comprising:

receiving a change request to change said database field;
identifying notification dependency business processes upon said receiving of said change request, wherein said notification dependency business processes comprise downstream systems that are dependent upon input from said database field to run business functions;
notifying said notification dependency business processes that said change request has been received;
identifying approval dependency business processes upon said receiving of said change request, wherein said approval dependency business processes comprise downstream systems that are dependent upon input from said database field to run business functions;
requesting approval to implement said change request from said approval dependency business processes;
defining transfer rules that define how data contained within said database field is transferred to said business process; and
implementing said change request, after performing said notifying process and after receiving approval from said approval dependency business processes.

2. The method of claim 1, all the limitations of which are incorporated herein by reference, further comprising creating a process definition based on said process wherein said process definition includes unique process identifiers for said process, an owner of said process, a description of said process, and contact information of said process.

3. The method of claim 1, all the limitations of which are incorporated herein by reference, further comprising creating a field definition from said database field, wherein said field definition includes a description of said database field, and a description of how said database field is grouped within said database.

4. The method of claim 1, all the limitations of which are incorporated herein by reference, further comprising creating a dependency definition from said dependency, wherein said dependency definition includes the dependency relationship between said database field and said process.

5. The method of claim 1, all the limitations of which are incorporated herein by reference, wherein said defining of said transfer rules defines:

when data contained within said database field is transferred to said process; and
how data contained within said database field is manipulated.

6. The method of claim 1, all the limitations of which are incorporated herein by reference, wherein said defining of said transfer rules further comprises documenting the transfer of said dependency to said system.

7. The method of claim 1, all the limitations of which are incorporated herein by reference, wherein said process of identifying said approval dependency processes includes comparing approval dependency processes approval signatures.

8. A method of managing a change request to a database field wherein at least one business process has a dependency on said database field, said method comprising:

creating a transfer bridge, based on said dependency, to control the transfer of data from said database field to said business process;
receiving a change request to change said database field;
identifying notification dependency business processes upon said receiving of said change request, wherein said notification dependency business processes comprise downstream systems that are dependent upon input from said database field to run business functions;
notifying said notification dependency business processes that said change request has been received;
identifying approval dependency business processes upon said receiving of said change request, wherein said approval dependency business processes comprise downstream systems that are dependent upon input from said database field to run business functions;
requesting approval to implement said change request from said approval dependency business processes; and
implementing said change request according to said transfer bridge after performing said notifying process and after receiving approval from said approval dependency business processes.

9. The method of claim 8, all the limitations of which are incorporated herein by reference, wherein said creating of said transfer bridge comprises:
  reading dependency information,
  extracting said dependency from said dependency information,
  preparing said dependency to be transferred to said process; and
  transferring said dependency to said process.

10. The method of claim 8, all the limitations of which are incorporated herein by reference, wherein said creating of said transfer bridge defines how data contained within said database field is transferred to said process.

11. The method of claim 8, all the limitations of which are incorporated herein by reference, wherein said creating of said transfer bridge defines:
  when data contained within said database field is transferred to said process; and
  how data contained within said database field is manipulated.

12. The method of claim 8, all the limitations of which are incorporated herein by reference, wherein said creating of said transfer bridge further comprises documenting the transfer of said dependency to said system.

13. The method of claim 8, all the limitations of which are incorporated herein by reference, further comprising creating a process definition based on said process wherein said process definition includes unique process identifiers for said process, an owner of said process, a description of said process, and contact information of said process.

14. The method of claim 8, all the limitations of which are incorporated herein by reference, further comprising creating a field definition from said database field, wherein said field definition includes a description of said database field, and a description of how said database field is grouped within said database.

15. The method of claim 8, all the limitations of which are incorporated herein by reference, further comprising creating a dependency definition from said dependency, wherein said dependency definition includes the dependency relationship between said database field and said process.

16. A program storage device readable by machine, tangibly embodying a program of instructions executable by the machine to perform a method of managing a change request to a database field wherein at least one business process has a dependency on said database field, said method comprising:
  defining transfer rules, based on said dependency, to control the transfer of data from said field to said process;
  receiving a change request to change said database field;
  identifying notification dependency business processes upon said receiving of said change request, wherein said notification dependency business processes comprise downstream systems that are dependent upon input from said database field to run business functions;
  notifying said notification dependent business processes that said change request has been received;
  identifying approval dependency business processes upon said receiving of said change request, wherein said approval dependency business processes comprise downstream systems that are dependent upon input from said database field to run business functions;
  requesting approval to implement said change request from said approval dependency business processes; and
  implementing said change request, after performing said notifying process and after receiving approval from said approval dependency business processes, according to said transfer rules.

17. The program storage device in claim 16, all the limitations of which are incorporated herein by reference, wherein said method further comprises creating a dependency definition from said dependency, wherein said dependency definition includes the dependency relationship between said database field and said process.

18. The program storage device in claim 16, all the limitations of which are incorporated herein by reference, wherein said defining of said rules includes how data contained within said database field is transferred to said process.

19. The program storage device in claim 16, all the limitations of which are incorporated herein by reference, wherein said process of identifying said approval dependency processes includes comparing approval dependency processes approval signatures.

* * * * *